United States Patent Office 2,948,393

Patented Aug. 9, 1960

1

2,948,393

BROMINE IN A SAFETY CONTAINER

Albert A. Gunkler, Midland, Mich., assignor to The Dow Chemical Company, Midland, Mich., a corporation of Delaware No Drawing. Filed May 4, 1959, Ser. No. 810,592

2 Claims. (Cl. 206—84)

This invention relates to bromine in a safety container and is more particularly concerned with an article of manufacture comprising bromine in a glass bottle, said glass bottle externally coated with a protective plastic.

Liquid bromine is a highly corrosive material. In contact with human skin, liquid bromine causes a severe chemical burn, often resulting in a permanent scar. Yet, bromine has many uses where it is decidedly advantageous over other less harmful materials. At the present time, bromine is being transported, stored, and dispensed in glass bottles subject to breakage. When such breakage occurs, the attendant danger to those persons in the vicinity is apparent.

For example, bromine is progressively replacing chlorine as a swimming pool antiseptic since the bromine provides equal antiseptical action without the swimmers suffering from eye irritation. The liquid bromine is transported to the users in a glass bottle readily adaptable for direct introduction into the swimming pool. The glass bottle is subject to being shattered when dropped or mishandled during the process of introducing the liquid bromine into the swimming pools and the broken glass particles in such a situation cause a serious hazard. This antiseptic application is merely one of the many areas in which breakable glass bromine containers produce a hazard.

However, glass is the only economical material known today that is capable of containing bromine satisfactorily. Other materials comparable to glass are unadaptable to bromine either because they are susceptible to bromine corrosion or pervious to bromine vapor. As an illustration, metallic containers will corrode readily in the presence of bromine and moisture. Although polyethylene and other similar plastics will withstand the corrosive effect; they nevertheless, lack the impervious quality desired for prolonged storage of bromine and its accompanying vapors.

A principal object of the present invention is to provide a container whereby liquid bromine may be transported, stored, or dispensed in a glass bottle without danger of the bromine injuriously contacting others in the event the glass container is inadvertently broken.

A further object of the present invention is to provide a temporary container for liquid bromine in the event the glass container is inadvertently broken; thereby causing the liquid bromine to be safely captured in the temporary container until such time as removal and disposal of the bromine may be effected.

To accomplish these objects, the present invention consists of liquid bromine contained in a glass bottle, said glass bottle being externally coated with polyethylene.

2

The glass bottle utilized is of a standard quality, common in the bottling industry. The size of the bottle is of little concern, since any bottle may be coated in the manner described so as to accomplish the desired result. However, as a matter of information and not limitation, quart bottles are most commonly used due to existing Federal regulations controlling the size of bromine bottles in interstate commerce.

The glass bottle may be externally coated with polyethylene in a number of ways. Either spraying the polyethylene onto the bottle or dipping the bottle into a polyethylene solution produces the most desirable results. Such polyethylene coating should be between approximately $\frac{1}{32}$ and approximately $\frac{1}{4}$ inch in thickness. Although a thicker coating is not deleterious, the added expense renders greater thickness economically impractical. On the other hand, a thinner coating of polyethylene would not be desirable due to the decrease in protection. To insure absolute safety from glass breakage, particularly in the neck area of the bottle, it is of considerable importance that the bottle be completely enclosed by the polyethylene coating, so as to include the neck of the bottle up to the point at which the capping device connects.

Any polyethylene composition which is (1) shatterproof; (2) melting point sufficiently high so as to not melt or become viscose at temperatures below 130° Fahrenheit; and (3) tensile strength sufficiently high, so as to be capable of supporting the weight of the bromine without assistance from the glass member of the bottle will be satisfactory. It is not foreseen that the safety feature envisioned by the use of a polyethylene coating would be needed at higher temperatures. However, should higher temperatures be encountered, the basic concept of this invention would include the use of higher melting polyethylene as the enclosing substance.

Thus, liquid bromine in a glass bottle with said bottle externally coated with polyethylene will provide inherent safety features. Should this glass bottle be broken, the bromine will not escape and cause injury, but will rather be enclosed by the coat of polyethylene. Then subsequent to the glass breakage, one may leisurely and safely take such steps as necessary to dispose of the bromine without fear of actual contact with the bromine.

Various modifications may be made in the present invention without departing from the spirit or scope thereof, and it is to be understood that I limit myself only as defined in the appended claims.

I claim:

1. An article of manufacture which comprises: bromine in a glass bottle externally coated with polyethylene.

2. An article of manufacture which comprises: bromine in a glass bottle externally coated with polyethylene, said polyethylene coating being between approximately $\frac{1}{32}$ and $\frac{1}{4}$ inch in thickness.

References Cited in the file of this patent

UNITED STATES PATENTS

| | | |
|---|---|---|
| 739,514 | Street | Sept. 22, 1903 |
| 2,728,475 | Teeters et al. | Dec. 27, 1955 |
| 2,785,985 | Magill | Mar. 19, 1957 |
| 2,890,794 | Deline | June 16, 1959 |